(12) United States Patent
Heath

(10) Patent No.: US 12,063,919 B2
(45) Date of Patent: Aug. 20, 2024

(54) LADDER-MOUNTED FISHING ROD CARRIER FOR RECREATIONAL VEHICLES

(71) Applicant: Jason Lee Heath, Westmoreland, KS (US)

(72) Inventor: Jason Lee Heath, Westmoreland, KS (US)

(73) Assignee: Jason Lee Heath, Westmoreland, KS (US)

( * ) Notice: Subject to any disclaimer, the term of this patent is extended or adjusted under 35 U.S.C. 154(b) by 466 days.

(21) Appl. No.: 17/380,427

(22) Filed: Jul. 20, 2021

(65) Prior Publication Data

US 2022/0022440 A1  Jan. 27, 2022

Related U.S. Application Data

(60) Provisional application No. 63/164,720, filed on Mar. 23, 2021, provisional application No. 63/056,668, filed on Jul. 26, 2020.

(51) Int. Cl.
*A01K 97/10* (2006.01)
*B60R 9/08* (2006.01)

(52) U.S. Cl.
CPC ............ *A01K 97/10* (2013.01); *B60R 9/08* (2013.01)

(58) Field of Classification Search
CPC ....... A01K 97/10; Y10S 224/922; B60R 9/08; B60R 5/04; B60R 2011/008; B60R 2011/004; B60R 7/08; B60R 9/06; A47B 81/005; E06C 7/14; E06C 7/143; E06C 7/16; E06C 7/081; E06C 7/084; E06C 5/00; E06C 5/32; E06C 7/00; A47F 7/0035; A47F 7/0021
USPC .......................... 43/21.2, 54.1; 182/127, 160
See application file for complete search history.

(56) References Cited

U.S. PATENT DOCUMENTS

| | | | | |
|---|---|---|---|---|
| 3,421,632 A * | 1/1969 | Wood | .................. | A47B 81/005 248/110 |
| 4,151,895 A * | 5/1979 | Rasada, Jr. | ............... | E06C 7/08 182/228.5 |
| 5,094,351 A * | 3/1992 | Barney | ................ | A47B 81/005 224/311 |
| 5,853,156 A * | 12/1998 | Moore | ...................... | E06C 7/14 224/558 |
| 2016/0045023 A1* | 2/2016 | Wagner | ................ | A47B 81/005 248/534 |

* cited by examiner

*Primary Examiner* — Peter M Poon
*Assistant Examiner* — Jeffrey R Larsen
(74) *Attorney, Agent, or Firm* — HOVEY WILLIAMS LLP

(57) ABSTRACT

A fishing rod carrier for mounting to a vertical ladder of a vehicle comprises a bottom receiver and a top receiver. The bottom receiver is configured to attach to the ladder at a first height and extend horizontally from the ladder. The bottom receiver includes holes formed therein. The top receiver is configured to attach to the ladder at a second height above the first height and extend horizontally from the ladder. The top receiver also includes holes formed therein.

20 Claims, 18 Drawing Sheets

US 12,063,919 B2

LADDER-MOUNTED FISHING ROD CARRIER FOR RECREATIONAL VEHICLES

RELATED APPLICATIONS

The present non-provisional application claims the benefit of U.S. Provisional Application Ser. No. 63/056,668, filed Jul. 26, 2020, entitled "LADDER-MOUNTED FISHING ROD CARRIER FOR RECREATION VEHICLES" and U.S. Provisional Application Ser. No. 63/164,720, filed Mar. 23, 2021, entitled "LADDER-MOUNTED FISHING ROD CARRIER FOR RECREATIONAL VEHICLES", both of which are hereby incorporated in their entireties by reference herein.

BACKGROUND

Due to its length, a fishing rod is often difficult to pack and transport. Most vehicles, even recreational vehicles, do not have storage space that can easily accommodate the length of a fishing rod. Additionally, a fishing rod can pose a sanitary and/or poking hazard when stored in spaces subject to human use or traffic. Further, if multiple fishing rods are stored together, they often become tangled. Thus, fishing rods often have to be disassembled and stored in small spaces away from other items. Disassembly and assembly are cumbersome and also prone to tangling.

The background discussion is intended to provide information related to the present invention which is not necessarily prior art.

SUMMARY OF THE INVENTION

Embodiments of the invention solve the above-described problems by providing improved fishing rod carriers for storing fishing rods on a vehicle.

A fishing rod carrier constructed according to an embodiment of the invention is configured to mount to a vertical ladder of a vehicle. The fishing rod comprises a bottom receiver and a top receiver. The bottom receiver is configured to attach to the ladder at a first height and extend horizontally from the ladder. The bottom receiver includes holes formed therein.

The top receiver is configured to attach to the ladder at a second height above the first height and extend horizontally from the ladder. The top receiver also includes holes formed therein. The receivers allow fishing rods to be readily and safely secured to the recreational vehicle. The holes of the top receiver can receive the upper portions of the fishing rods, while the holes of the bottom receiver receive the handles of the fishing rods so that the fishing rods rest on the bottom receiver. The holes of the top receiver keep the fishing rods organized so that they do not get tangled.

In another embodiment of the invention, the bottom receiver of the fishing rod carrier includes two bottom platforms with holes formed therein. The bottom platforms are spaced apart to define a space therebetween. The top receiver likewise includes two top platforms with holes formed therein. The top platforms are similarly spaced apart to define a space therebetween. A user is able to pass through the spaces between the two platforms of the receivers when using the ladder of the vehicle. This allows one to readily store fishing rods while still having access to the ladder of the vehicle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
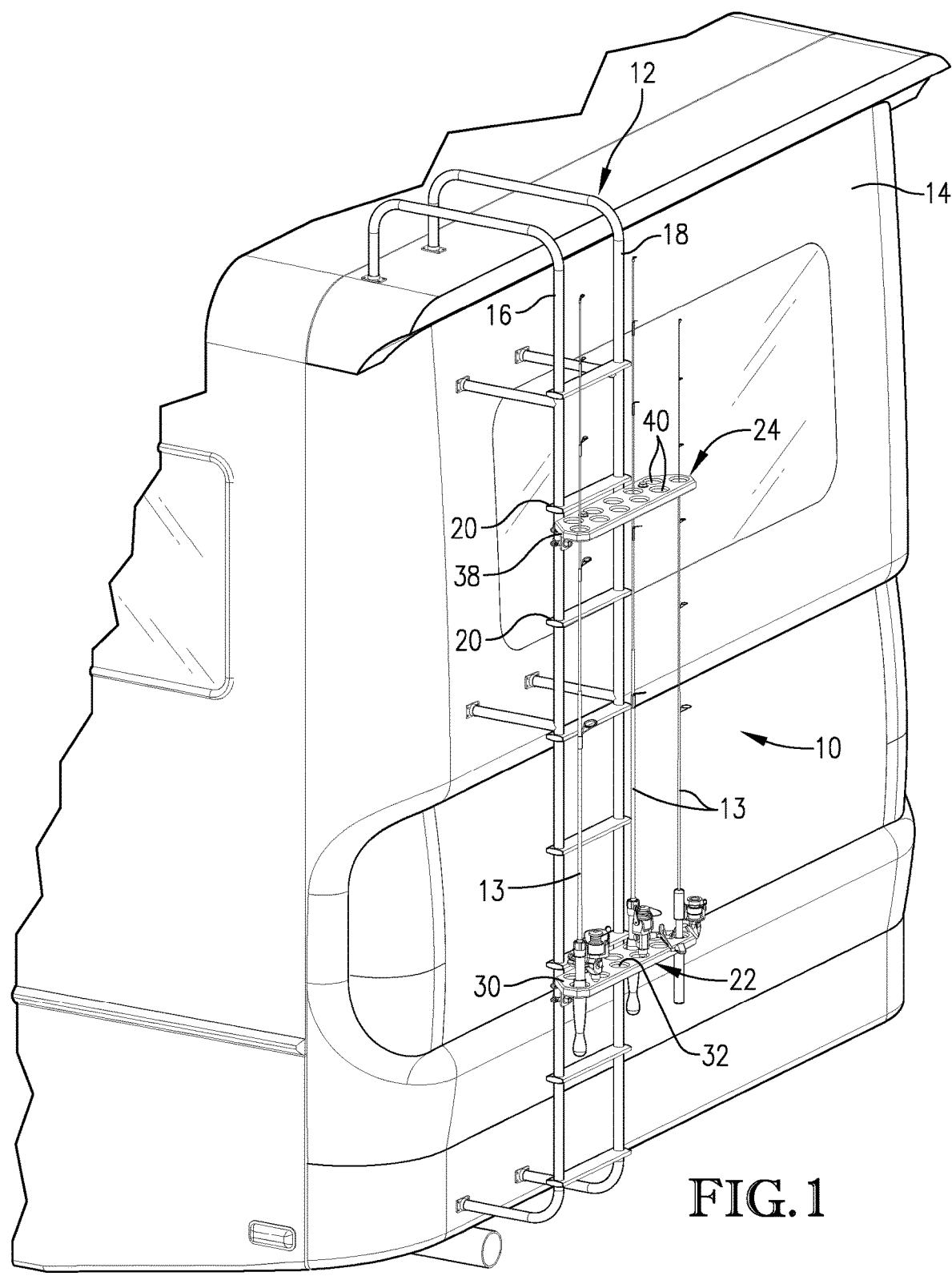
FIG. 1 is a perspective view of a fishing rod carrier constructed in accordance with embodiments of the present invention attached to a ladder of a vehicle.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, a fishing rod carrier 10 constructed according to an embodiment of the present invention is depicted carrying a plurality of rods 13. The fishing rod carrier 10 is attached to a ladder 12 of a vehicle 14. The ladder 12 may include a pair of side rails 16, 18 and a plurality of rungs 20 extending between the side rails 16, 18. The vehicle 14 depicted is a recreational vehicle, or camper, but the vehicle 14 may be any vehicle without departing from the scope of the present invention, such as a class A, B, or C recreational vehicle, a fifth wheel, a travel trailer, a toy hauler, a truck camper, a horse trailer, or the like.

The fishing rod carrier 10 comprises a bottom receiver 22 and a top receiver 24. The bottom receiver 22 is configured to be attached to the ladder 12 at a first height. The bottom receiver 22 may be configured to be semi-permanently attached to the side rails 16, 18 of the ladder 12, independent of the top receiver 24, at an elevation that allows for (a) ease of access to place/remove fishing rods 13 from the ground, (b) clear visibility of the recreational vehicle 14 signal/brake lights and/or license plate from the rear with fishing rods 13 installed, (c) minimal impedance of ascension/descension of the roof access ladder 12, and (d) placing the tips of installed poles below the uppermost features of the recreational vehicle 14.

Figure 2:
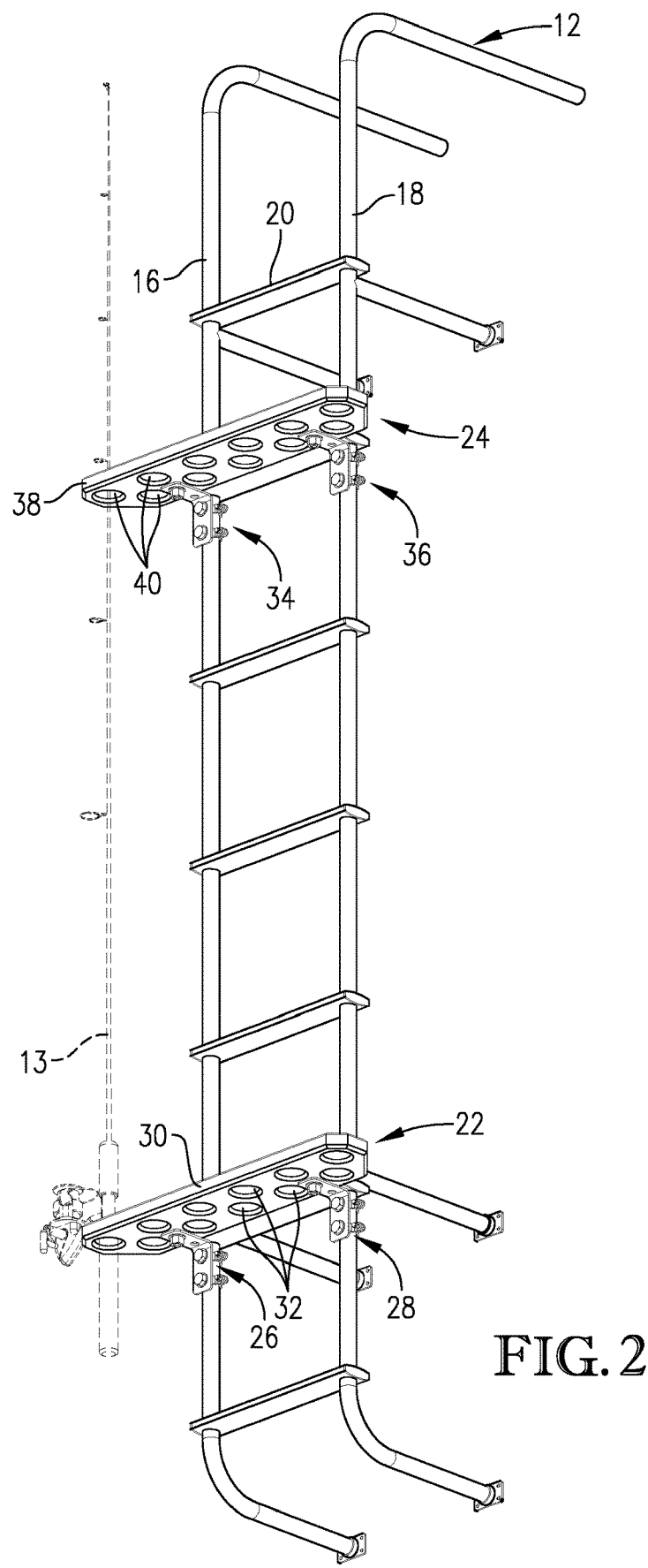
FIG. 2 is a lowered perspective view of the fishing rod carrier of FIG. 1 attached to the ladder.

Turning to FIG. 2, the bottom receiver 22 may provide both radial and axial support for the rods 13 being transported while the top receiver 24 prevents the rods 13 from rotating off the bottom receiver 22. The bottom receiver 22 is operable to securely capture the handle-end of the stowed rods 13 and may comprise two or more semi-permanent attachment devices 26, 28 and a platform 30 with a plurality of holes 32 formed therein. The top receiver 24 is configured to be attached to the ladder 12 at a second height above the first height, i.e., above the bottom receiver 22. The top receiver 24 may be configured to be in vertical alignment with the bottom receiver 22 when both are attached to the ladder 12 and/or stacked on top of one another. The top receiver 24 may be configured to be semi-permanently attached to the side rails 16, 18 of the ladder 12, independent of the bottom receiver 22, at an elevation that allows for (a) minimal impedance of ascension/descension of the roof access ladder and (b) sufficient support and secure capture of the rod-end of the stowed rods 13. The top receiver 24 may likewise comprise two or more attachment devices 34, 36 and a platform 38 with a plurality of holes 40 formed therein for securing the rod end of the fishing rods 13. Both the bottom receiver 22 and the top receiver 24 may be constructed of high-density polyethylene, or some other rigid, corrosion resistant, ultraviolet-rated material. The receivers 22, 24 maybe be formed in various sizes, counts, and configurations to accommodate the many types, lengths, and quantities of rod/reel combinations available without departing from the scope of the present invention.

Figure 3:
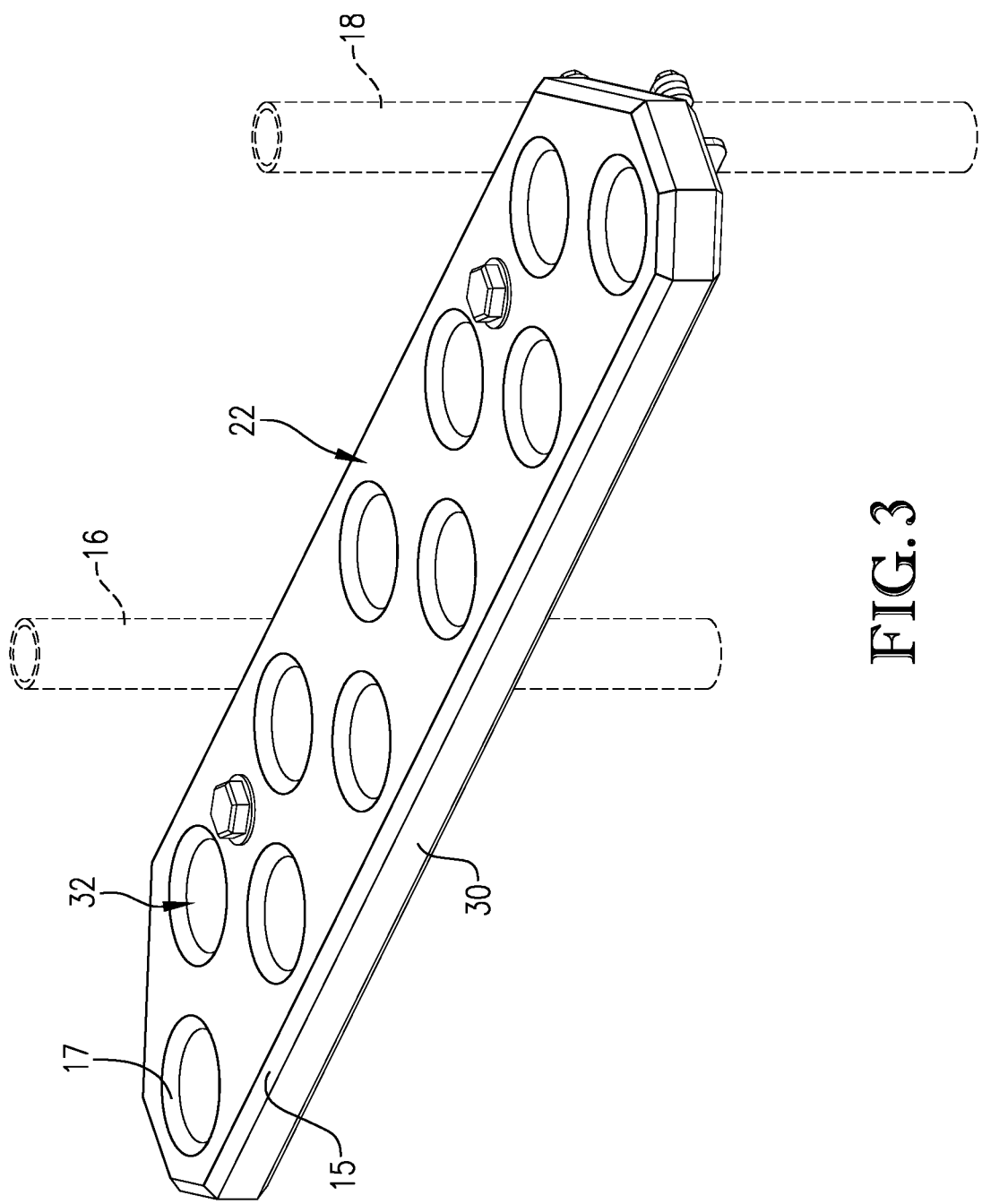
FIG. 3 is a front perspective view of an exemplary receiver of the fishing rod carrier of FIG. 1.
Figure 4:
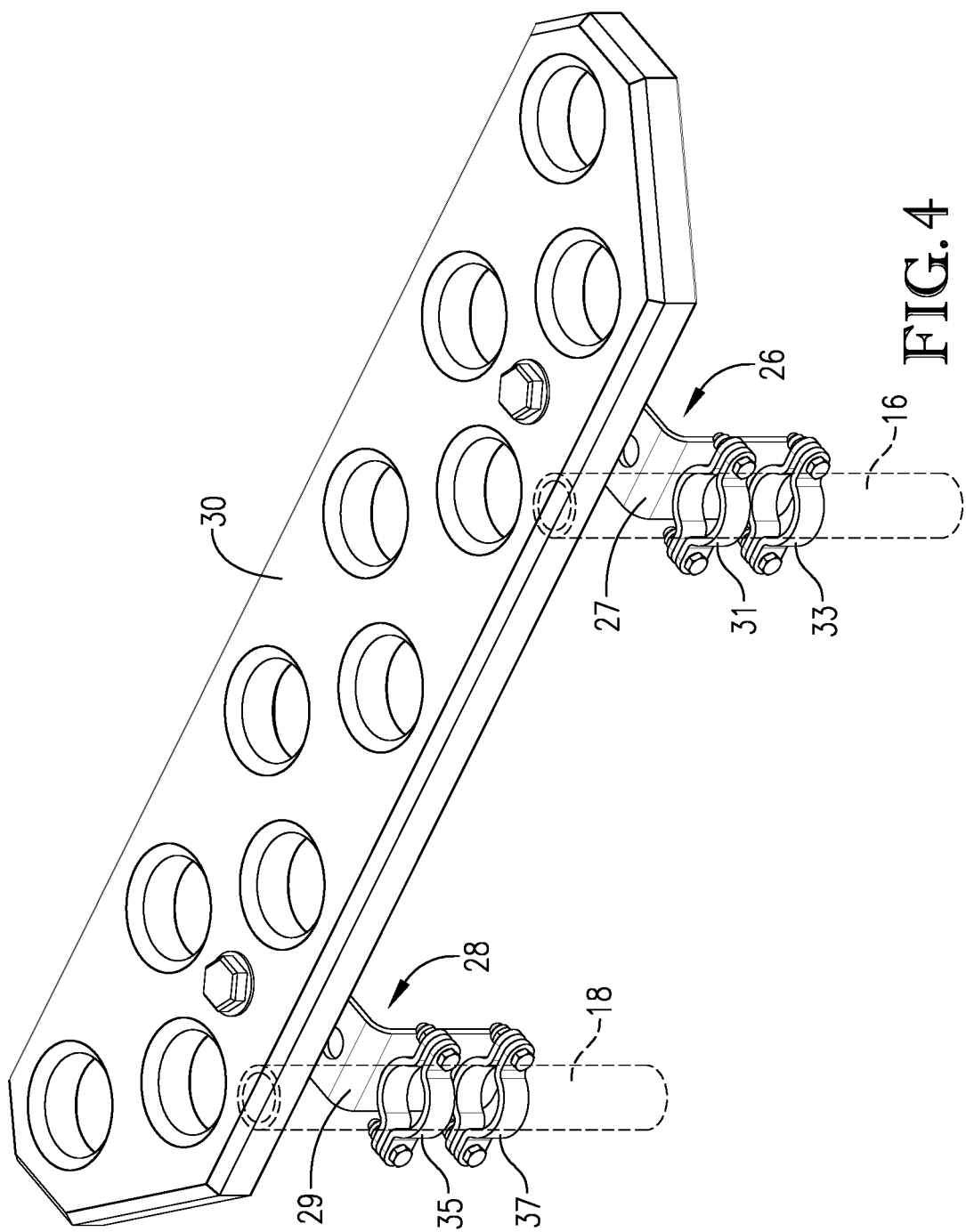
FIG. 4 is a rear perspective view of the receiver of FIG. 3.
Figure 5:
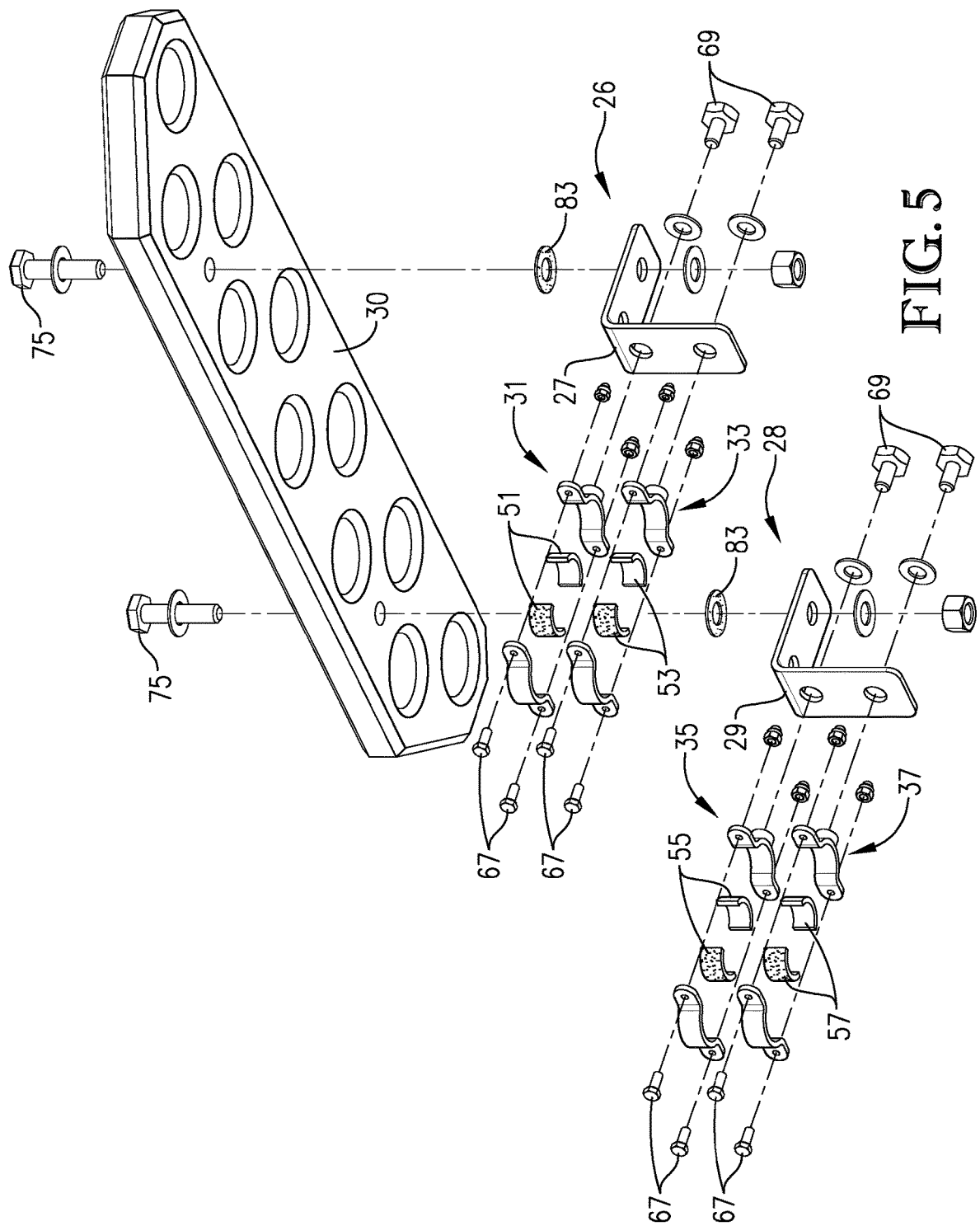
FIG. 5 is an exploded view of the receiver of FIG. 3.

FIGS. 3-5 depict an exemplary receiver in detail representing the embodiment of the bottom receiver and the top receiver of FIGS. 1 and 2. The reference numerals are consistent with the bottom receiver for example purposes. Turning to FIG. 3, the receiver 22 may be operable to attach to the side rails 16, 18 of the ladder, and the platform 30 may extend horizontally relative to the vertical side rails 16, 18. The holes 32 may be formed so that the rods can extend down vertically through the platform 30. The edges 15, 17 of the platform 30 and holes 32 may be chamfered at, for example, 45 degrees to avoid damaging the rods. The edges 15, 17 may be profiled to prevent rod/line contact with sharp edges, thus protecting both from any damage during transport. Turning to FIG. 4, the receiver 22 may have at least one attachment device 26, 28 one each of its ends. The attachment devices 26, 28 may comprise L-shaped brackets 27, 29 attached to the platform 30 and extending downward with mounting brackets 31, 33, 35, 37, such as clamshell fixtures, operable to clamp onto the side rails 16, 18 of the ladder.

Turning to FIG. 5, the attachment devices 26, 28 may further comprise resilient materials 51, 53, 55, 57, such as rubber or EPDM rubber lining. The mounting brackets 31, 33, 35, 37 may be constructed of, or coated with, corrosion-resistant materials. The mounting brackets 31, 33, 35, 37 may wrap around the outside of the side rails, which may be a manufacturer-installed recreational vehicle ladder. The resilient materials 51, 53, 55, 57 may (a) dampen vibration, (b) mitigate any tendency to slip axially down the side rails, and (c) provide non-marring attachments that are secure but leave no trace of their presence after removal. The brackets 31, 33, 35, 37 may be held in place by a series of appropriately sized, corrosion-resistant locking fasteners 67. The brackets 31, 33, 35, 37 may provide a secure attachment point that receive appropriately sized, corrosion-resistant locking fasteners 69 for securing the brackets 31, 33, 35, 37 to the L-brackets 27, 29. The L-shaped brackets 27, 29 may transfer the vertical support provided by the brackets 31, 33, 35, 37 into horizontal support for the receiver 22. The L-shaped brackets 27, 29 may also be corrosion resistant, or coated with corrosion resistant materials, and connected to the platform 30 with appropriately sized corrosion-resistant locking fasteners 75. Additional resilient materials 83 may be incorporated into each of the fastener locations for additional vibration-dampening. The receiver 22 and the attachment devices 26, 28 may be adjustable and configured to accommodate differing designs, orientations (rear and/or side-mounted), and dimensions of various makes and models of recreational vehicles and roof access ladders.

Turning back to FIG. 1, the fishing rod carrier 10 may be manufactured using a variety of materials, in a variety of sizes, colors, finishes, and configurations without departing from the scope of the present invention. Additionally, the elevations of, and distance between the two receivers 22, 24 may be varied without departing from the scope of the present invention, thereby making the fishing rod carrier 10 configurable to a wide range of ladder designs and lengths of rods 13 to be transported.

Installation of the rods 13 to be stowed may include feeding the tip of the rod 13 up through one of the holes 40 in the top receiver 24. The size and orientation of the top receiver 24 are operable to create only a minor and manageable obstruction for those infrequent access requirements to the recreational vehicle roof. The top receiver 24 may be configured to provide radial support for the rods 13 being transported. The holes 32 in the bottom receiver 22 are configured to effectively capture the handle-end of the stowed rods 13. The installation may further include feeding the handle of the rod 13 down through the corresponding holes 32 in the bottom receiver 22 until the installed reel of the rod 13 rests on the platform 30 of the bottom receiver 22. Removal of the rod(s) 13 may comprise moving the rod 13 upward until the end of the handle clears the bottom receiver 22 and moving the rod 13 downward until the end of the tip clears the top receiver 24.

Figure 6:
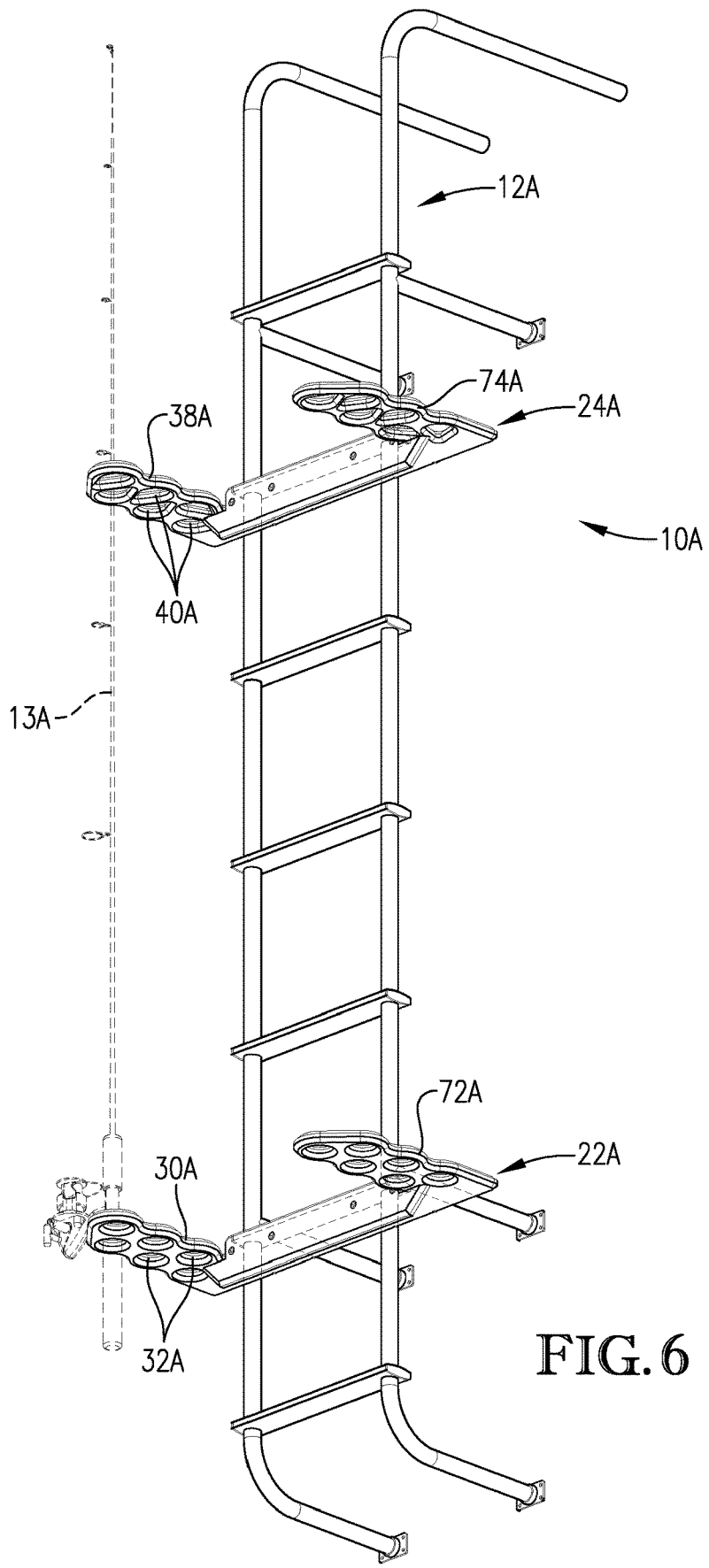
FIG. 6 is a perspective view of a fishing rod carrier constructed according to another embodiment of the present invention and attached to a ladder.

A fishing rod carrier 10A constructed in accordance with another embodiment of the invention is shown in FIG. 6. The fishing rod carrier 10A may comprise substantially similar components as fishing rod carrier 10; thus, the components of fishing rod carrier 10A that correspond to similar components in fishing rod carrier 10 have an 'A' appended to their reference numerals. The principal difference between the carrier 10A and the carrier 10 is that the top and bottom receivers of carrier 10A each include two platforms spaced apart through which a user can move when using the ladder 12A, as discussed in further detail below.

Figure 7:
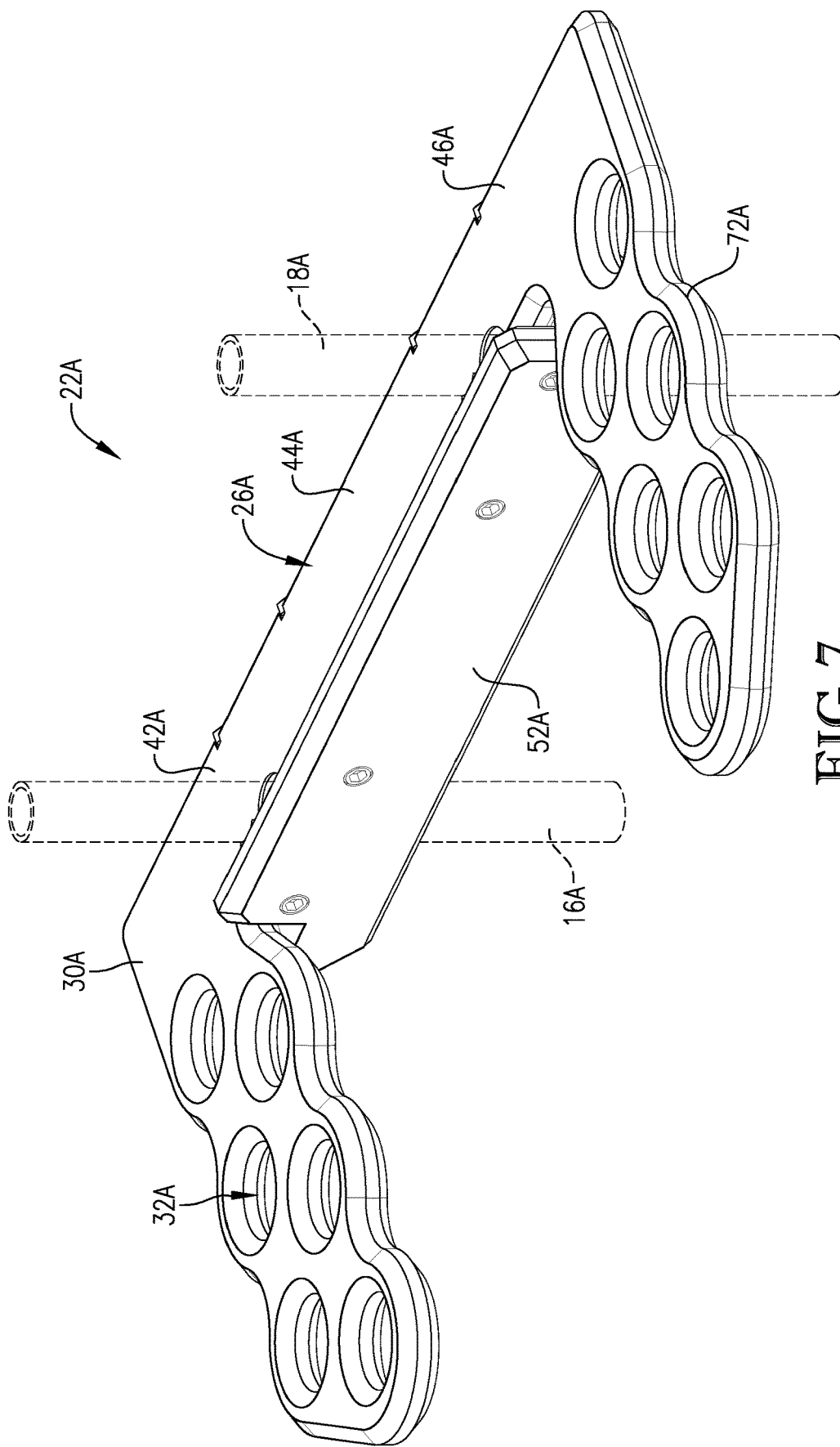
FIG. 7 is an elevated front perspective view of a bottom receiver of the fishing rod carrier of FIG. 6.
Figure 8:
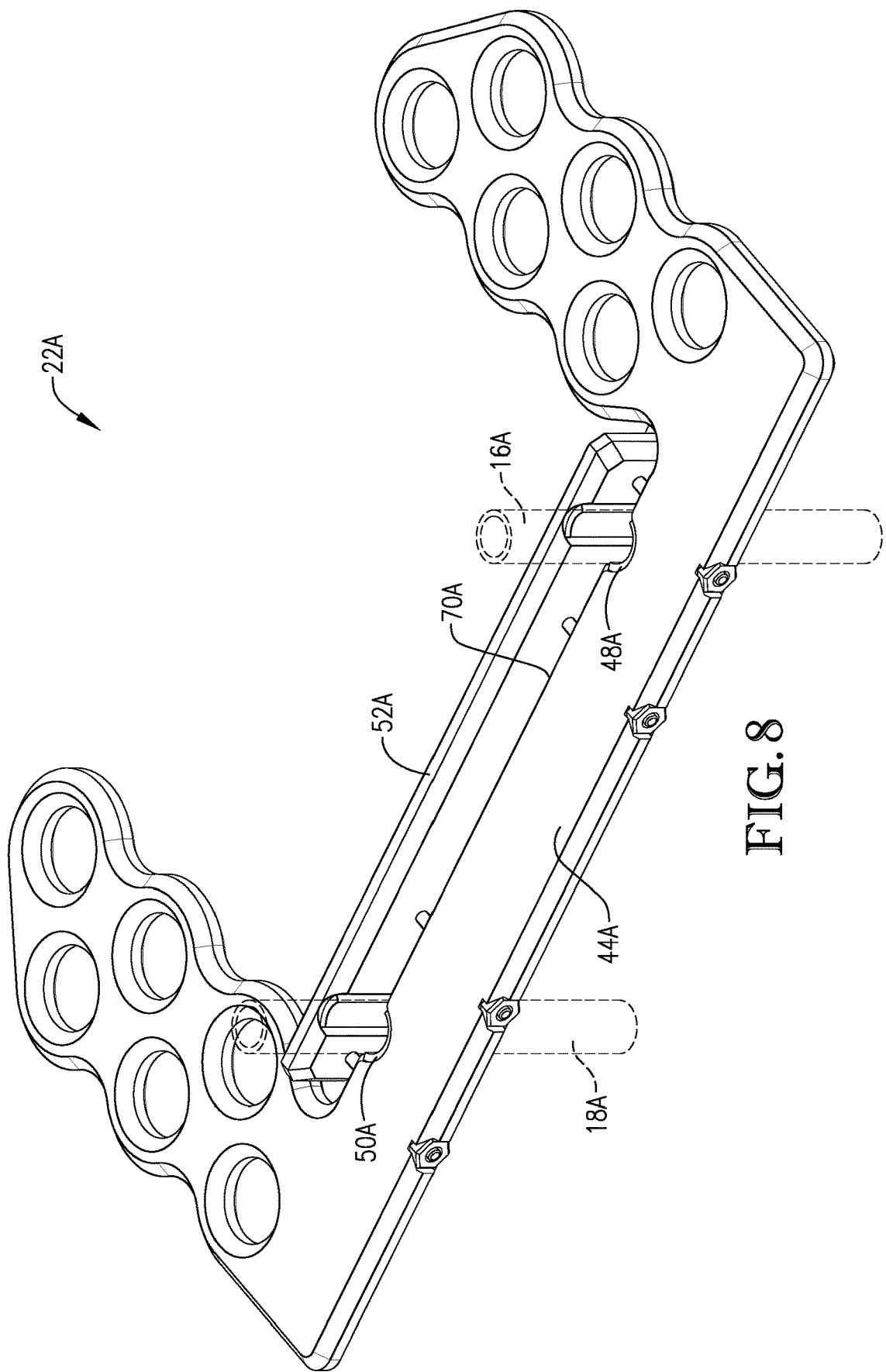
FIG. 8 is an elevated rear perspective view of the bottom receiver of FIG. 7.
Figure 9:
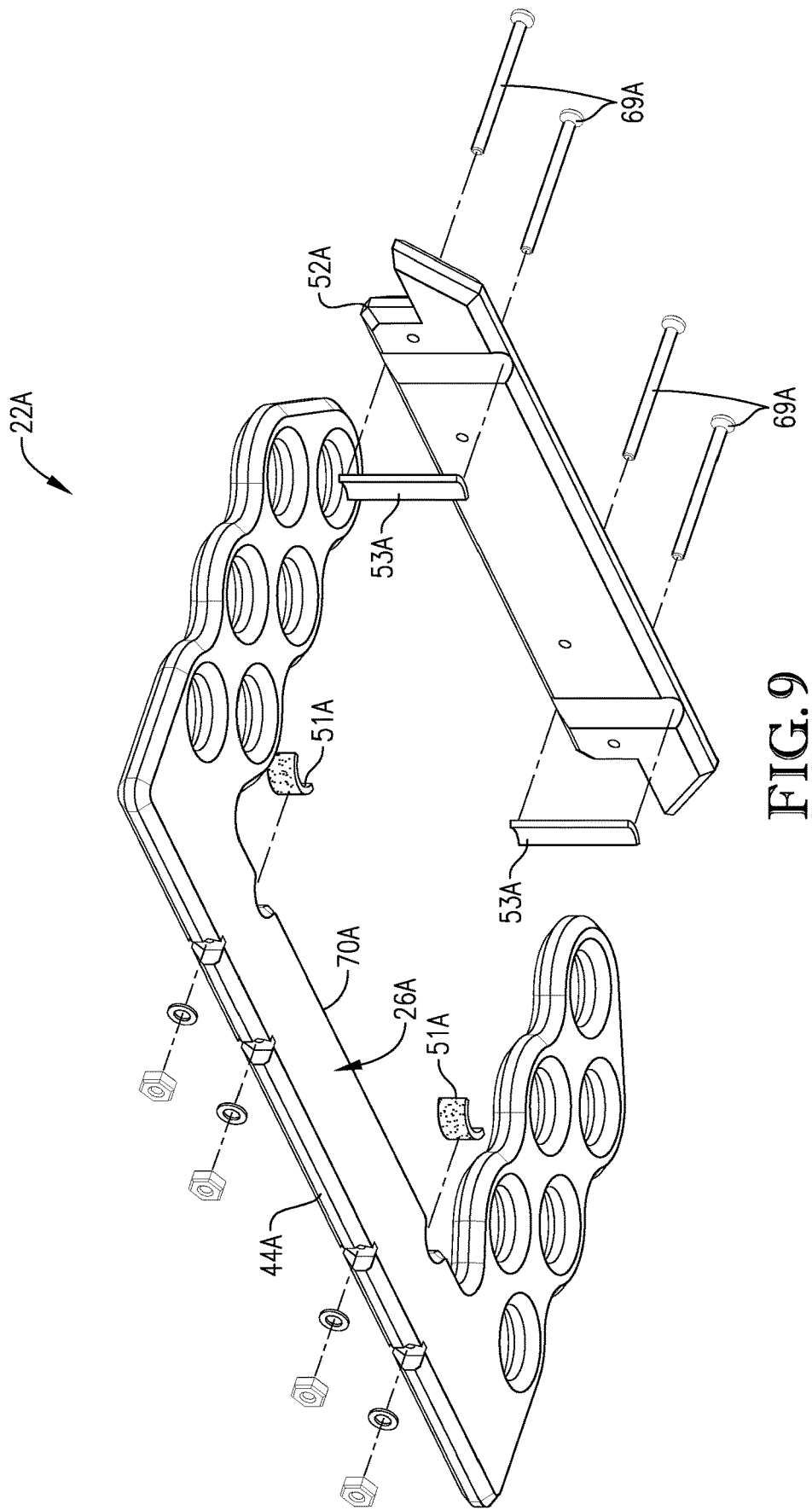
FIG. 9 is an exploded view of the bottom receiver of FIG. 7.

The fishing rod carrier 10A comprises a bottom receiver 22A and a top receiver 24A. Turning to FIG. 7, the bottom receiver 22A includes a bottom attachment 26A and two or more platforms 30A, 72A. The bottom attachment 26A may include a first end 42A, a middle portion 44A, a second end 46A, and a clamping portion 52A. Turning to FIG. 8, the middle portion 44A may comprise a front side 70A having two or more slots 48A, 50A for receiving the side rails 16A, 18A of the ladder 12A (depicted in FIG. 6). The clamping portion 52A may connect to the middle portion 44A and clamp the side rails 16A, 18A in the slots 48A, 50A, thereby securing the bottom receiver 22A to the ladder. Turning to FIG. 9, the clamping portion 52A may be secured to the middle portion 44A via one or more fasteners 69A. The fasteners 69A may extend through the clamping portion 52A and into the front side 70A of the bottom attachment 26A. This makes the fasteners 69A easy to access, which enables quick installation of the receiver 22A. The clamping portion 52A may extend vertically from the middle portion 44A. In some embodiments, the middle portion 44A and the clamping portion 52A may include one or more resilient members 51A, 53A such as rubber or EPDM rubber, for gripping the side rails and absorbing shock.

Turning back to FIG. 7, the platforms 30A, 72A extend from the ends 42A, 46A of the attachment device 26A to define a space therebetween for receiving the ladder. The space also enables a user to access and use the ladder even when the receiver 22A is attached to the ladder. The platforms 30A, 72A include a plurality of holes 32A formed therein for receiving the bottom ends of the rods 13A. The holes 32A may be cylindrical or any other shape without departing from the scope of the present invention. The platforms 30A, 72A may extend horizontally away from the vehicle when attached. However, the platforms 30A, 72A may extend any direction without departing from the scope of the present invention.

Figure 10:
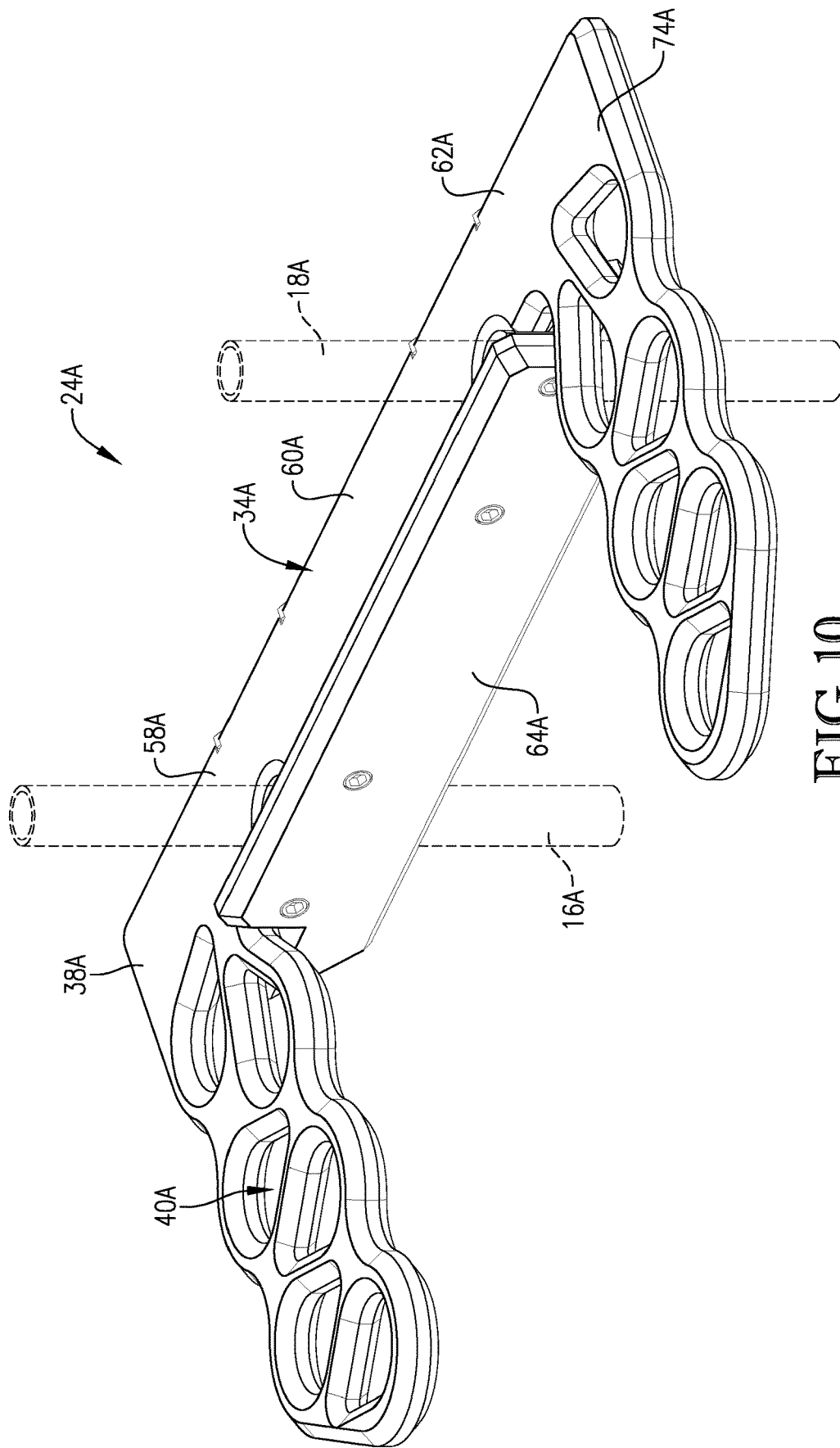
FIG. 10 is an elevated front perspective view of a top receiver of the fishing rod carrier of FIG. 6.
Figure 11:
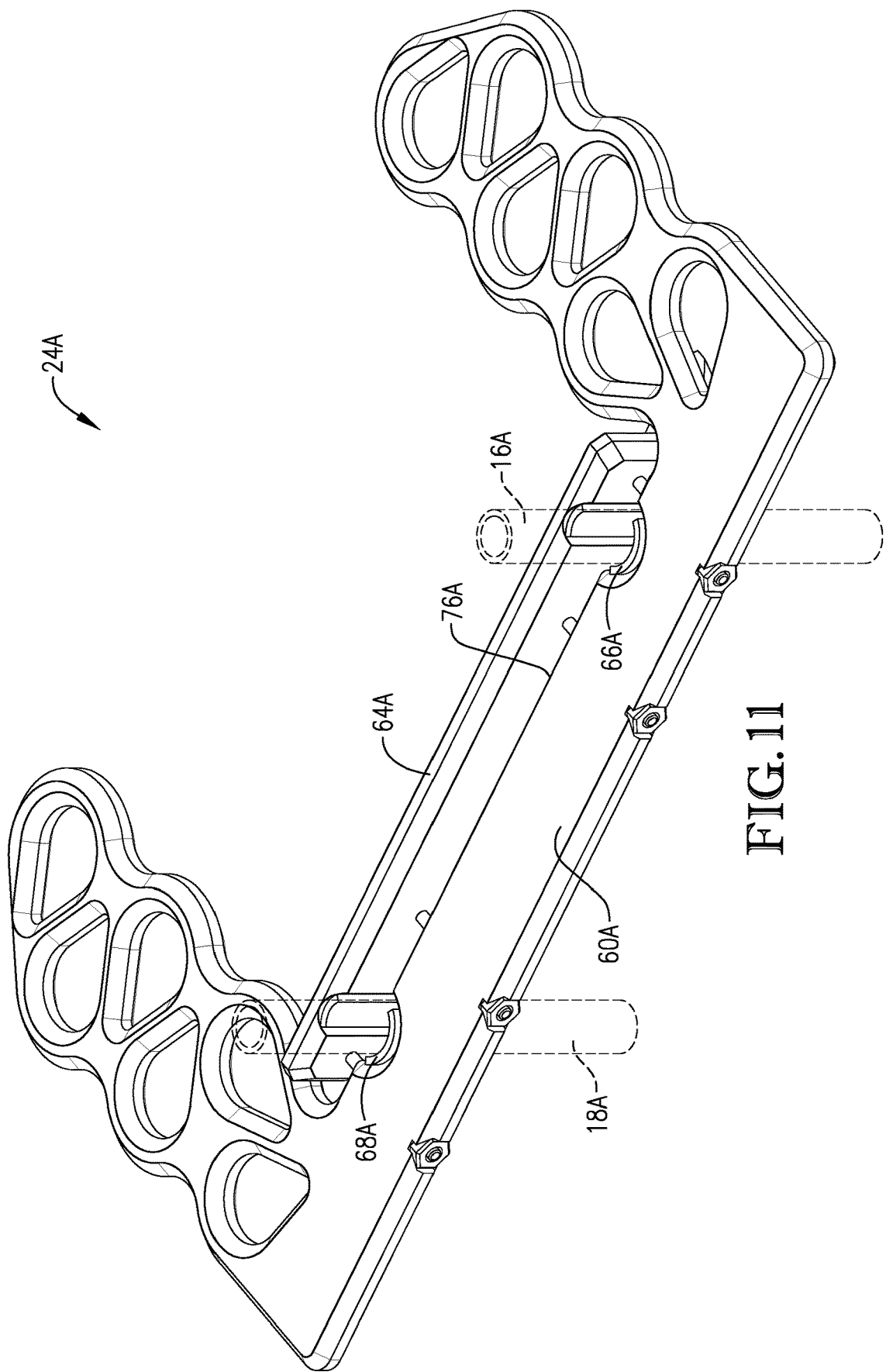
FIG. 11 is an elevated rear perspective view of the top receiver of FIG. 10.
Figure 12:
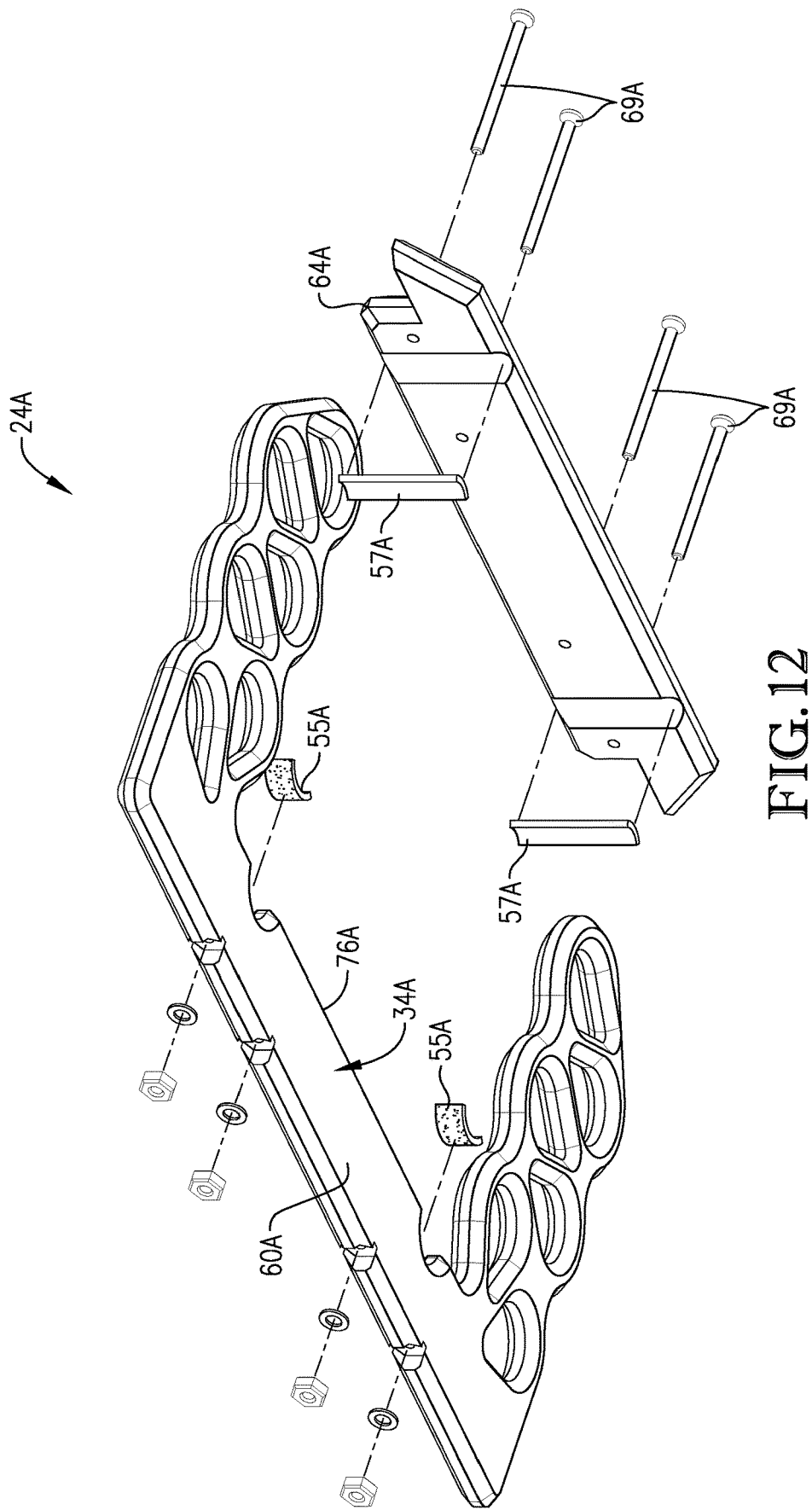
FIG. 12 is an exploded view of the top receiver of FIG. 10.

Turning to FIG. 10, the top receiver 24A includes a top attachment 34A and two or more platforms 38A, 74A. The top attachment 34A may include a first end 58A, a middle portion 60A, a second end 62A, and a clamping portion 64A. Turning to FIG. 11, the middle portion 60A may comprise a front side 76A having two or more slots 66A, 68A for receiving the side rails 16A, 18A of the ladder. The clamping portion 64A may connect to the middle portion 60A and clamp the side rails 16A, 18A in the slots 66A, 68A, thereby securing the top receiver 24A to the ladder. Turning to FIG. 12, the clamping portion 64A may also be secured to the middle portion 60A via one or more fasteners 69A. The fasteners 69A may extend through the clamping portion 64A and into the front side 76A of the top attachment 34A. This makes the fasteners 69A easy to access, which enables quick installation of the top receiver 24A. The clamping portion 64A may extend vertically from the middle portion 60A. In some embodiments, the middle portion 60A and the clamping portion 64A may include one or more resilient members 55A, 57A, such as rubber or EPDM rubber, for gripping the side rails and absorbing shock.

Turning back to FIG. 10, the platforms 38A, 74A extend from the ends 58A, 62A of the attachment device 34A to define a space therebetween for receiving the ladder. The space also enables a user to access and use the ladder even when the receiver 24A is attached to the ladder. The platforms 38A, 74A include a plurality of holes 40A formed therein for receiving the top ends of the rods 13A. The holes 40A may be tear drop shaped to accommodate the poles and eyes of the guides of the rods 13A. However, the holes 40A may comprise any other shape without departing from the scope of the present invention, such as oblong-shaped, oval-shaped, circular, or the like. As depicted in FIG. 6, when the receivers 22A, 24A are attached to the ladder 12A and in vertical alignment, the holes 32A of the bottom receiver 22A may be vertically aligned with the holes 40A of the top receiver 24A. The platforms 38A, 74A may extend horizontally away from the vehicle 14A. However, the platforms 38A, 74A may extend any direction without departing from the scope of the present invention.

The receivers 22A, 24A may comprise UV-rated sheet HDPE. The fasteners 69A (depicted in FIGS. 9 and 12) may be about 3.5 inches long with ¼-20 flat socket cap screws. The fasteners 69A (depicted in FIGS. 9 and 12) may include quarter-inch flat washers and quarter-inch nylon locknuts. The holes 32A may be about 1.625 inches in diameter for accommodating the rods 13, and the slots 48A, 50A, 66A, 68A (depicted in FIGS. 8 and 11) may be about 1.25 inches in diameter to accommodate the side rails 16A, 18A of the ladder 12A. The receivers 22A, 24A may include a quarter of an inch 45-degree chamfer on a plurality of the edges. The receivers 22A, 24A may be injection molded and/or made of structural foam. The width of the space between the platforms 30A, 72A may be about 14 inches. The width of the space between the platforms 38A, 74A may likewise be about 14 inches. The platforms 30A, 72A, 38A, 74A may have widths of about 5 inches and lengths of about 13.25 inches. The attachments 26A, 34A (depicted in FIGS. 7 and 10, respectively) may have widths of about 24 inches. And the clamping portions 52A, 64A (depicted in FIGS. 7 and 10, respectively) may have heights of about 3 inches. The number of holes 32A, 40A may be located to accommodate any number of fishing rods 13A, such as 6, 8, 10, or 12 fishing rods 13A.

Figure 13:
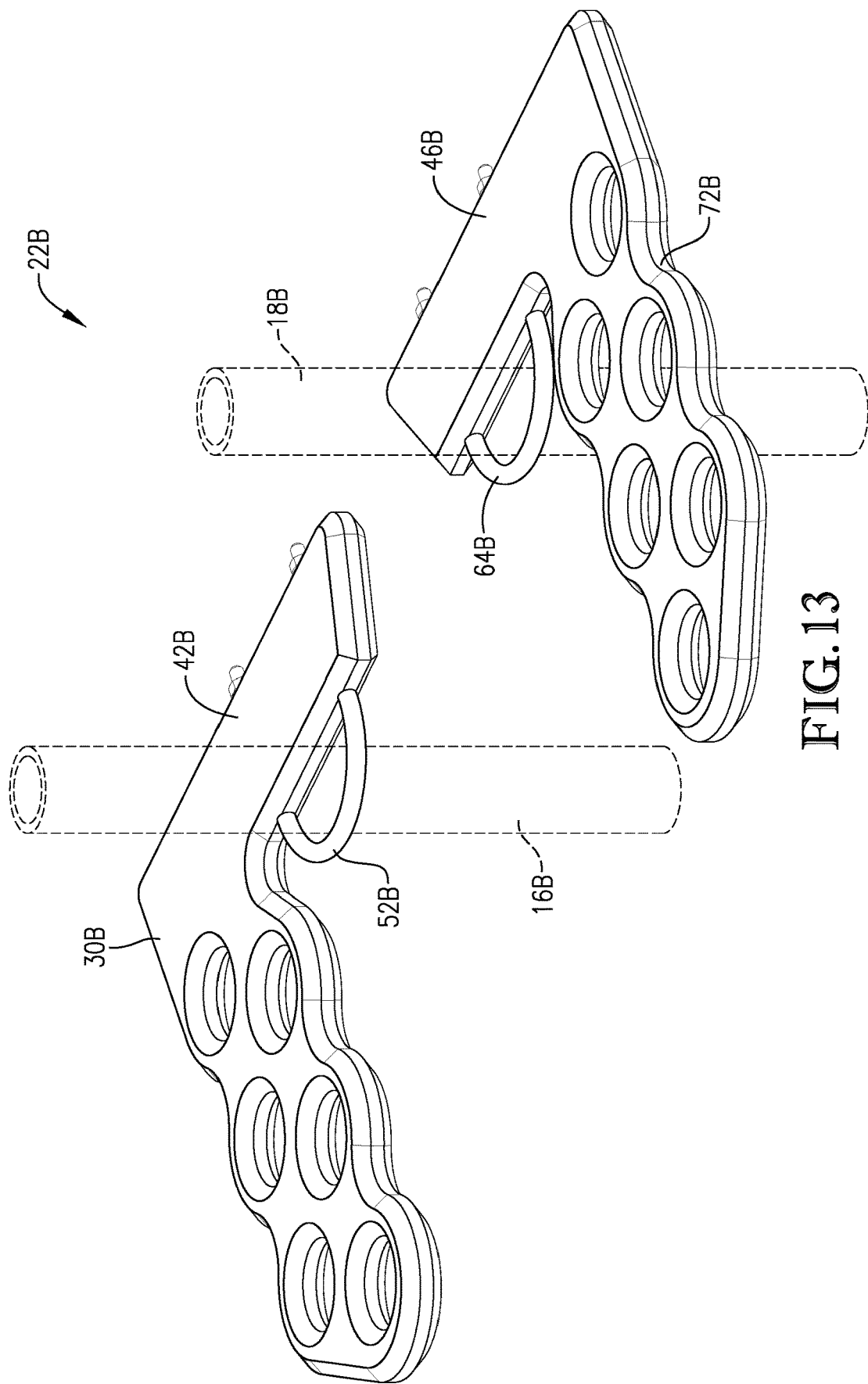
FIG. 13 is a front perspective view of an exemplary receiver constructed according to another embodiment of the present invention.
Figure 14:
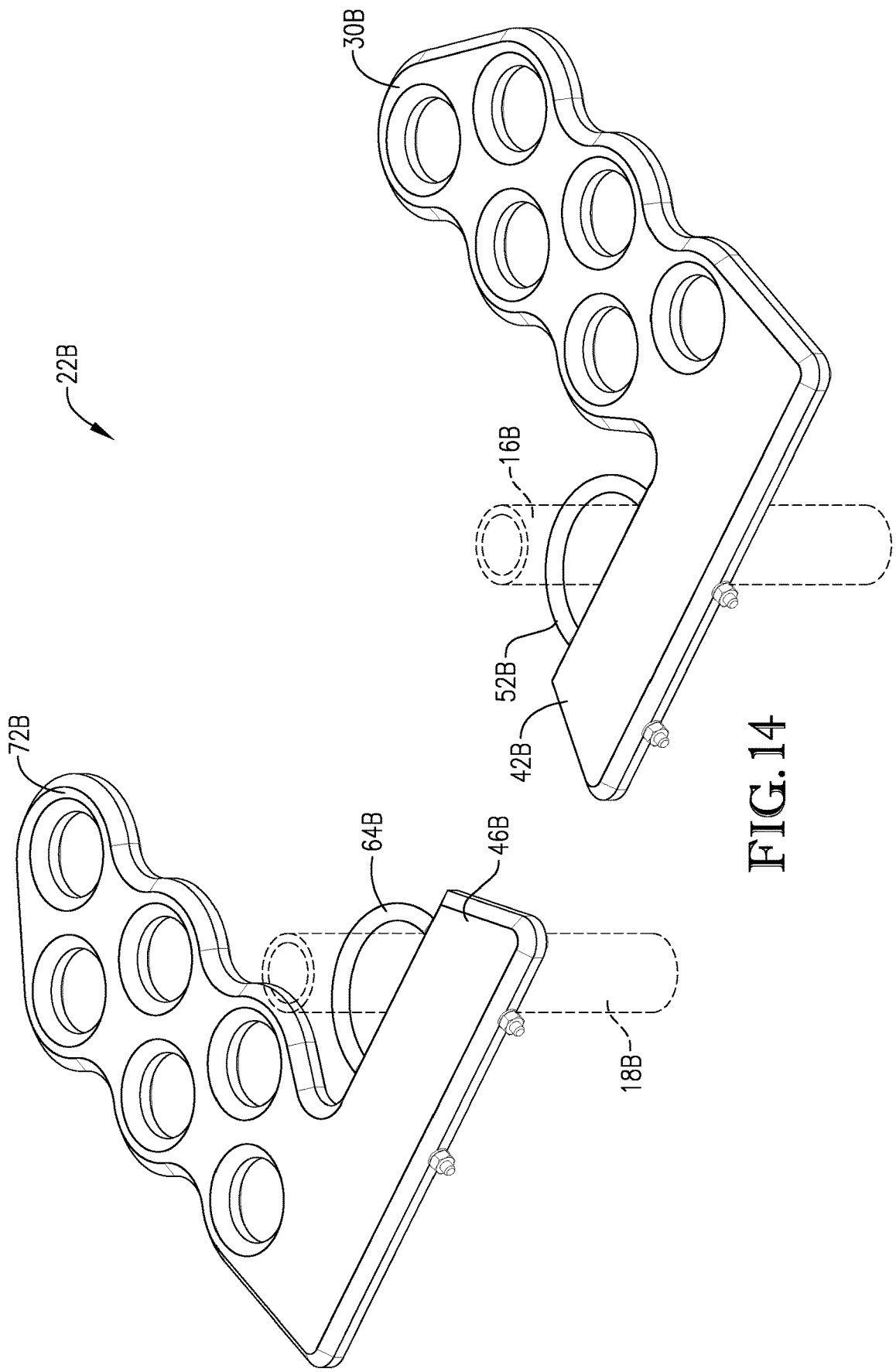
FIG. 14 is a rear perspective view of the receiver of FIG. 13.
Figure 15:
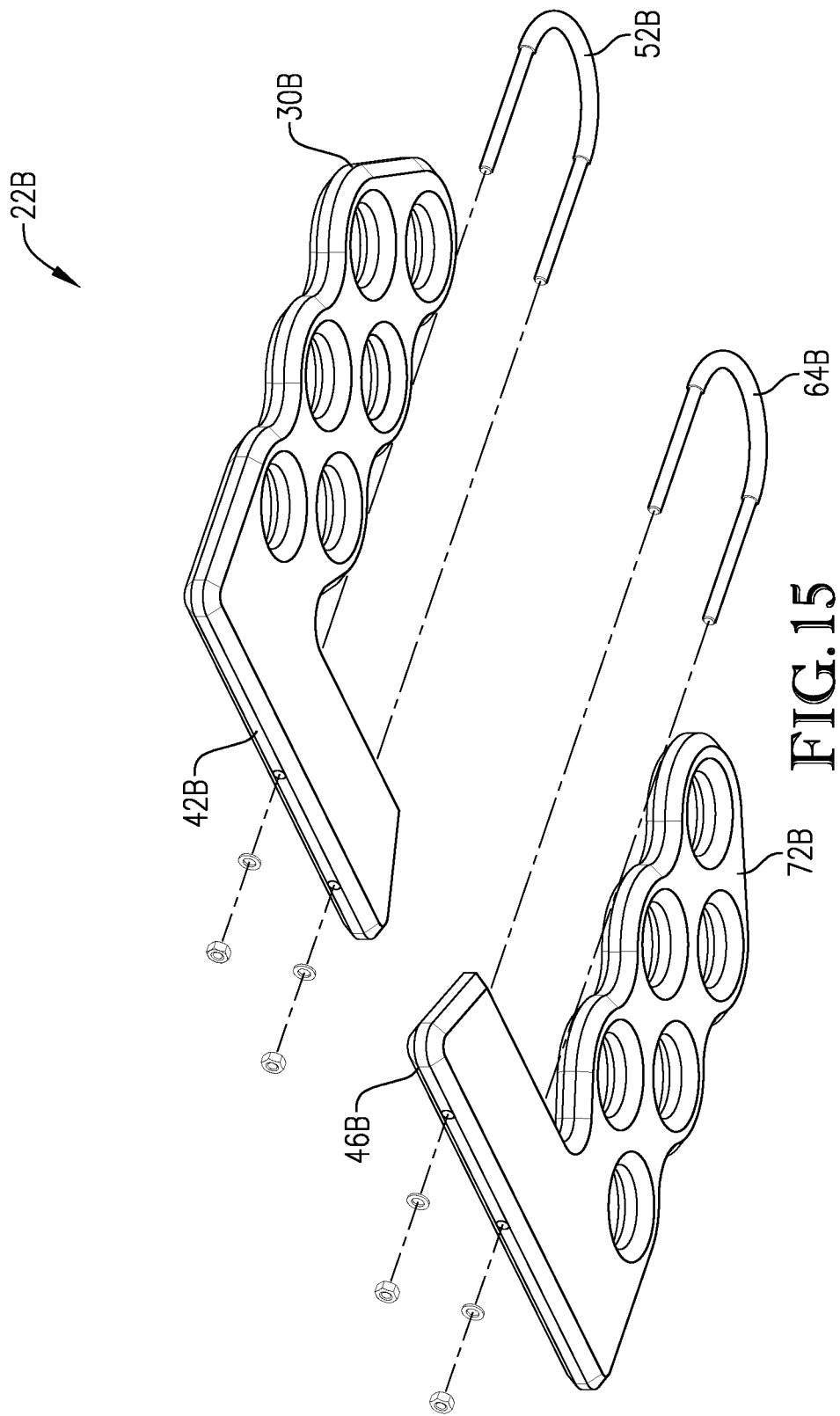
FIG. 15 is an exploded view of the receiver of FIG. 13.

A receiver 22B of a fishing rod carrier constructed in accordance with another embodiment of the invention is shown in FIG. 13. The receiver 22B may comprise substantially similar components as receiver 22A; thus, the components of receiver 22B that correspond to similar components in receiver 22A have a 'B' appended to their reference numerals. The principal difference between the receiver 22B and the receiver 22A is that the platforms 30B, 72B are separate pieces. Each platform 30B, 72B may include portions 42B, 46B that extend behind the side rails 16B, 18B and U-bolts 52B, 64B connected to the portions 42B, 46B that wrap around the side rails 16B, 18B to secure their respective platforms 30B, 72B to the rails 16B, 18B. As depicted in FIGS. 14 and 15, the U-bolts 52B, 64B of each platform 30B, 72B of the receiver 22B may extend through the portions 42B, 46B.

Figure 16:
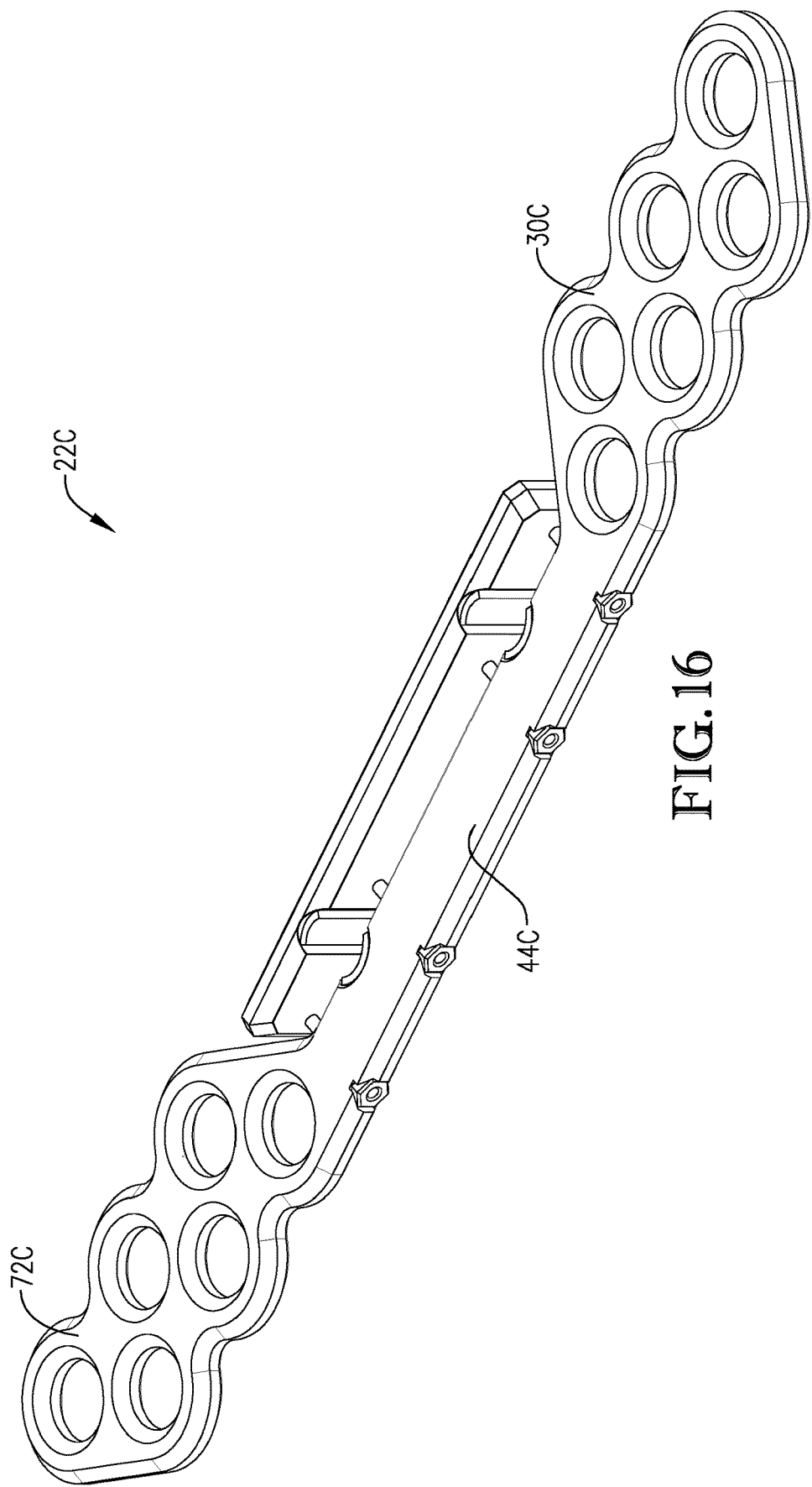
FIG. 16 is a rear perspective view of an exemplary receiver constructed according to another embodiment of the present invention.

A receiver 22C of a fishing rod carrier constructed in accordance with another embodiment of the invention is shown in FIG. 16. The receiver 22C may comprise substantially similar components as receiver 22A; thus, the components of receiver 22C that correspond to similar components in receiver 22A have a 'C' appended to their reference numerals. The principal difference between the receiver 22C and the receiver 22A is that the platforms 30C, 72C extend away from one another from opposite sides of the middle portion 44C.

Figure 17:
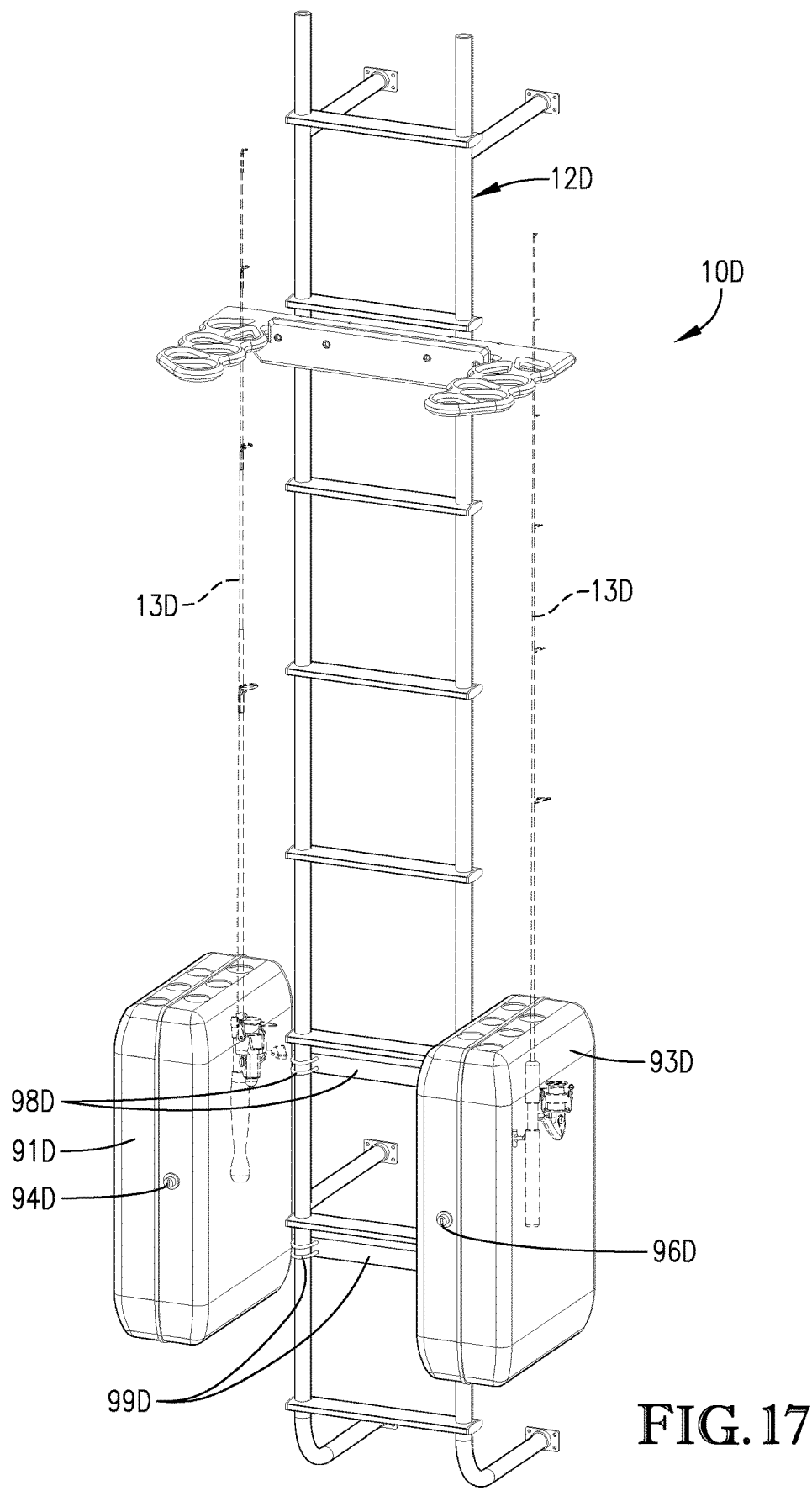
FIG. 17 is a perspective view of a cover of the fishing rod carrier of FIG. 6.

A fishing rod carrier 10D constructed in accordance with another embodiment of the invention is shown in FIG. 17. The fishing rod carrier 10D may comprise substantially similar components as fishing rod carrier 10A; thus, the components of fishing rod carrier 10D that correspond to similar components in fishing rod carrier 10A have a 'D' appended to their reference numerals. The principal difference between the carrier 10D and the carrier 10A is that the fishing rod carrier 10D may further comprise covers 91D, 93D operable to envelop the reels of the rods 13D and include built-in bottom receivers, thereby providing additional protection from dust, dirt, wind, rain, sun, and potential of theft. The covers 91D, 93D may include locks 94D, 96D that secure the covers 91D, 93D about the reels of the rods 13D and brackets 98D, 99D that secure the covers 91D, 93D to the ladder 12D.

Figure 18:
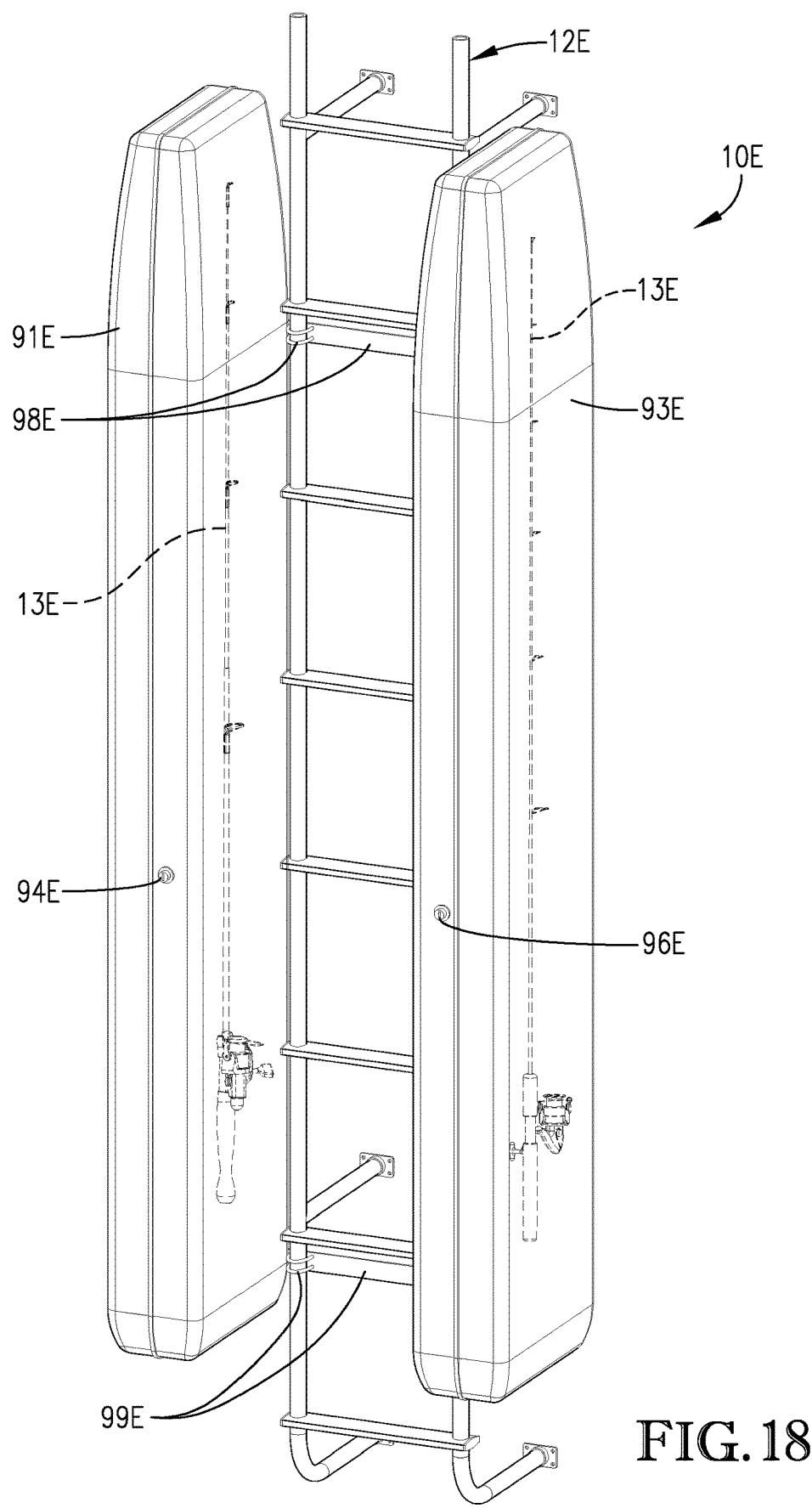
FIG. 18 is a perspective view of a cover constructed according to another embodiment of the invention.

A fishing rod carrier 10E constructed in accordance with another embodiment of the invention is shown in FIG. 18. The fishing rod carrier 10E may comprise substantially similar components as fishing rod carrier 10D; thus, the components of fishing rod carrier 10E that correspond to similar components in fishing rod carrier 10D have an 'E' appended to their reference numerals. The principal difference between the carrier 10E and the carrier 10D is that the covers 91E, 93E are operable to envelop the entirety of the rods 13E and include built-in receivers, thereby providing additional protection from dust, dirt, wind, rain, sun, and potential of theft. The covers 91E, 93E may also include locks 94E, 96E that secure the covers 91E, 93E about the reels of the rods 13E and brackets 98E, 99E that secure the covers 91E, 93E to the ladder 12E.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of any claims set forth at the end of any issuing patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A fishing rod carrier for mounting to side rails of a vertical ladder of a vehicle, the fishing rod carrier comprising:
    a bottom receiver configured to attach to the ladder at a first height, the bottom receiver comprising:
        a bottom portion configured to extend horizontally behind the vertical ladder when attached thereto,
        one or more bottom fastener configured to secure the bottom portion to at least one of the side rails of the vertical ladder, and
        a first bottom platform operatively associated with the bottom portion and configured to extend in a space beside the vertical ladder when the bottom receiver is attached to the vertical ladder so that a user can access the ladder when the bottom receiver is attached to the vertical ladder, the first bottom platform having a plurality of holes formed therein; and
    a top receiver for attaching to the ladder at a second height above the first height, the top receiver comprising:
        a top portion configured to extend horizontally behind the vertical ladder when attached thereto,
        one or more top fastener configured to secure the top portion to at least one of the side rails of the vertical ladder, and
        a first top platform operatively associated with the top portion and configured to extend in a space beside the vertical ladder when the top receiver is attached to the vertical ladder so that a user can access the ladder when the top receiver is attached to the vertical ladder, the first top platform having a plurality of holes formed therein.

2. The fishing rod carrier of claim 1, wherein the plurality of holes of the bottom receiver are aligned with the plurality of holes of the top receiver when the bottom receiver and the top receiver are attached to the ladder in vertical alignment.

3. The fishing rod carrier of claim 1, wherein:
the bottom receiver comprises a second bottom platform spaced apart from the first bottom platform and including a plurality of holes formed in the second bottom platform, and
the top receiver comprises a second top platform spaced apart from the first top platform and including a plurality of holes formed in the second top platform.

4. The fishing rod carrier of claim 3, wherein the first bottom platform and the second bottom platform are operable to attach to siderails of the ladder with the ladder positioned between the first bottom platform and the second bottom platform.

5. The fishing rod carrier of claim 4, wherein the first top platform and the second top platform are operable to attach to the siderails of the ladder with the ladder positioned between the first top platform and the second top platform.

6. The fishing rod carrier of claim 3, wherein:
the second bottom platform is operatively associated with the bottom portion,
the bottom portion comprises a pair of slots formed therein that are operable to receive the side rails of the ladder,
the bottom receiver includes a clamping portion operable to enclose the side rails in the pair of slots, and
the one or more bottom fastener is configured to press the clamping portion against the side rails and the bottom portion.

7. The fishing rod carrier of claim 6, wherein the bottom portion comprises resilient material disposed in the pair of slots for gripping the side rails.

8. The fishing rod carrier of claim 6, wherein the clamping portion extends vertically away from the bottom portion.

9. The fishing rod carrier of claim 6, wherein:
the second top platform is operatively associated with the top portion,
the top portion comprises a pair of slots formed therein that are operable to receive the side rails of the ladder,
the top receiver includes a clamping portion operable to enclose the side rails in the pair of slots, and
the one or more top fastener is configured to press the clamping portion against the side rails and the top portion.

10. The fishing rod carrier of claim 3, wherein:
the bottom portion is a first bottom portion,
the bottom receiver includes a second bottom portion operatively associated with the second bottom platform,
the top portion is a first top portion, and
the top receiver includes a second top portion operatively associated with the second top platform.

11. The fishing rod carrier of claim 1, wherein the plurality of holes of the top receiver are tear-drop shaped.

12. The fishing rod carrier of claim 1, wherein the first bottom platform extends transversely relative to the bottom portion, and the first top platform extends transversely relative to the top portion.

13. A fishing rod carrier for mounting to vertical side rails of a ladder on a recreational vehicle, the fishing rod carrier comprising:
a bottom receiver for attaching to the ladder at a first height, the bottom receiver including—
a first bottom portion configured to couple to at least one of the side rails of the ladder; and
a first bottom platform extending from the bottom portion so that the first bottom platform is horizontal relative to the ladder when the bottom receiver is attached to the ladder, the first bottom platform comprising a first plurality of holes formed therein; and
a top receiver for attaching to the ladder at a second height above the first height, the top receiver including—
a first top portion configured to couple to at least one of the side rails of the ladder; and
a first top platform extending from the first top portion so that the first top platform is horizontal relative to the ladder when the top receiver is attached to the ladder, the first top platform comprising a second plurality of holes formed therein.

14. The fishing rod carrier of claim 13, wherein—
the bottom receiver comprises:
a second bottom portion configured to couple to at least one of the side rails for the ladder opposite to the first bottom portion, and
a second bottom platform extending from the second bottom portion so that the second bottom platform is horizontal relative to the ladder when the bottom receiver is attached to the ladder, the second bottom platform comprising a third plurality of holes formed therein, and
the top receiver comprises:
a second top portion configured to couple to at least one of the side rails for the ladder opposite to the first top portion, and
a second top platform extending from the second top portion so that the second top platform is horizontal relative to the ladder when the top receiver is attached to the ladder, the second top platform comprising a fourth plurality of holes formed therein that are aligned with the third plurality of holes.

15. The fishing rod carrier of claim 13, further comprising U-bolts configured to help secure the first bottom portion and the first top portion to the ladder.

16. A fishing rod carrier for mounting to vertical side rails of a ladder on a recreational vehicle, the fishing rod carrier comprising:
a bottom receiver for attaching to the ladder at a first height, the bottom receiver including—
a left bottom platform extending horizontally relative to the side rails when the bottom receiver is attached to the ladder, the left bottom platform comprising a first plurality of holes formed therein,
a right bottom platform spaced apart from the left bottom platform so that the side rails are between the left bottom platform and the right bottom platform, the right bottom platform extending horizontally relative to the side rails when the bottom receiver is attached to the ladder, the right bottom platform including a second plurality of holes formed therein, and
a bottom middle portion configured to couple to the side rails of the ladder and extending from the left bottom platform to the right bottom platform; and
a top receiver for attaching to the ladder at a second height above the first height, the top receiver including—
a left top platform extending horizontally relative to the side rails when the top receiver is attached to the ladder, the left top platform comprising a third plurality of holes formed therein,
a right top platform spaced apart from the left top platform so that the side rails are between the left top platform and the right top platform, the right top platform extending horizontally relative to the side rails when the top receiver is attached to the ladder, the right top platform including a fourth plurality of holes formed therein, and a top middle portion configured to couple to the side rails of the ladder and extending from the left top platform to the right top platform.

17. The fishing rod carrier of claim 16, wherein the bottom middle portion and the top middle portion each comprise— a pair of slots formed therein that are operable to receive the side rails of the ladder, a clamping portion operable to enclose the side rails in the pair of slots, and a fastener configured to squeeze the side rails between the clamping portion and the respective middle portion.

18. The fishing rod carrier of claim 17, wherein the bottom middle portion comprises a front side, wherein the slots of the bottom middle portion are formed on the front side and the bottom left platform and bottom right platform extend from the front side of the bottom middle portion away from the recreational vehicle when attached to the ladder.

19. The fishing rod carrier of claim 16, wherein the left bottom platform and the right bottom platform extend in directions parallel relative to a longitudinal length of the bottom middle portion.

20. The fishing rod carrier of claim 16, wherein the left bottom platform and the right bottom platform extend in directions transverse relative to a longitudinal length of the bottom middle portion, and the left top platform and the right top platform extend in directions transverse relative to a longitudinal length of the top middle portion.

* * * * *